United States Patent Office 2,834,804
Patented May 13, 1958

2,834,804

DICARBOXYPHENYLPHOSPHONIC ACID

Hans Z. Lecher, Plainfield, and Ruth A. Greenwood, Somerville, N. J., assignors to American Cyanamid Company, New York, N. Y., a corporation of Maine No Drawing. Application July 10, 1956
Serial No. 596,820

12 Claims. (Cl. 260—515)

This invention relates to an (o-dicarboxyphenyl) phosphonic acid and its salts and a process for preparing them.

Attempts have been made in the past to prepare phosphonic acid derivatives of the isomeric benzene dicarboxylic acids. So far they have failed. When it is attempted to oxidize phosphonic acids derived from m- and p-xylene, only one of the two methyl groups is oxidized to a carboxylic acid group.

According to the present invention phosphonic acid derivatives of phthalic acid and their salts are prepared by a new method. The position of the phosphonic acid group is not exactly known but there is good reason to believe that the product obtained is at least predominantly of the formula

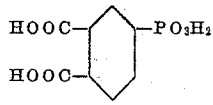

The process of the present invention involves two steps, the first is the chlorination of the phosphonic dichloride derived from o-xylene (I) until at least 2 chlorine and preferably 4 to 5 have been introduced into the methyl groups. The chlorination is effected under conditions normally used for chlorinating side chains preferably with the use of irradiation to act as a photocatalyst. The product of the first step (II) of the process is then hydrolyzed with alkali and simultaneously oxidized with permanganate, producing the salt of the desired phosphonic derivative of phthalic acid. When potassium permanganate with potassium hydroxide as the alkali is used, the tetrapotassium salt is obtained from which the difficultly soluble mono-potassium salt (III) can be precipitated by suitable neutralization of the strongly alkaline solution with acid. The mechanism of the preferred modification of the process is shown in the following equations in which for simplicity, the phosphonic group is shown in its most probable location:

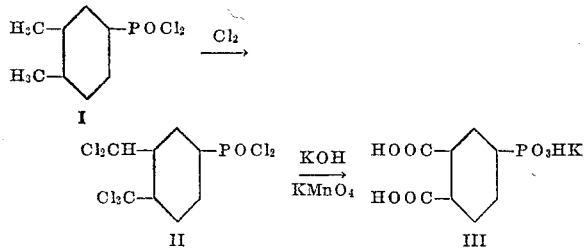

The Formula II shows the maximum possible chlorination of the side chains. As pointed out above, useful results are obtainable with less complete chlorination down to the minimum of one chlorine atom in each side chain. After isolation of the mono-potassium salt, the free phosphonic acid and other salts or partial salts of the compound may be produced by customary metathetic reactions. Thus, for example, other alkali metal salts may be produced such as the sodium salts, alkaline earth metal salts such as magnesium, calcium and barium, and other polyvalent metal salts such as aluminum, iron, zinc, etc. salts. In fact the cation attached to the acid groups is not limited; it is an advantage that salts of any base including nitrogenous bases such as ammonia, primary, secondary, tertiary amines and quaternary compounds can be made. In this respect the original compound behaves as a tetrabasic acid in which of course the basicity of the different hydrogen atoms varies in the normal manner.

The phosphonic dichloride of o-xylene which is a starting material for the process of the present invention may be prepared by any desired method, for example, o-xylene can be reacted with hexagonal phosphoric anhydride to form two types of aryl phosphonic derivatives as described in the copending application of Lecher, Chao and Whitehouse, Serial No. 345,264, filed March 27, 1953, now U. S. Patent No. 2,717,906. These primary reaction products may be hydrolyzed to the phosphonic acid and the latter chlorinated with phosphorus pentachloride or the primary reaction products may be reacted directly with phosphorus pentachloride, both processes being described and claimed in Greenwood, Scalera and Lecher, Ser. No. 357,368, filed May 25, 1953, now abandoned. It is in no sense necessary to isolate the phosphonic acid as the reaction product gives a mixture which can be chlorinated in the second step.

The production of the phosphonic dichloride of o-xylene results normally in a minor amount of chlorination of the methyl groups. In the formulae given above this minor amount of side chain chlorination is not shown and it should be understood that in the specification and claims when reference is made to the phosphonic dichloride derivatives of o-xylene this includes compounds in which there is a minor amount of side chain chlorination.

Compounds of the present invention are valuable intermediates for the production of organic coloring matters of various types, such as phthalocyanine coloring matters.

It is an advantage of the present invention that the chlorination step proceeds smoothly and does not require any critical conditions. Elevated temperatures are of course necessary but the range is broad from 100° to 200° C.

The invention will be described in greater detail in conjunction with the following specific examples in which the parts are by weight.

*Example 1*

264.3 parts of o-xylene and 71 parts of commercial phosphoric anhydride (ratio $10C_8H_{10}:1P_4O_{10}$) are heated in an autoclave with agitation at 275° C. until the reaction is complete. After cooling, the autoclave content consists of a black pitch and a xylene solution. Without separation the unreacted o-xylene is distilled off. The still residue is treated with 167 parts by weight by phosphorus oxychloride and 322 parts of phosphorus pentachloride. This mixture is heated with stirring to reflux until the evolution of hydrogen chloride ceases. Then sulfur dioxide is passed in to destroy the excess phosphorus pentachloride. The thionyl chloride and the phosphorus oxychloride formed are distilled off and then the phosphonic dichloride is distilled under reduced pressure. The dichloride crystallizes on cooling.

The phosphonic dichloride thus prepared is heated to 90° C. and then chlorine is passed in. The reaction mixture is irradiated with ultraviolet light. The temperature is gradually raised to 190° C. within approximately 5 hours and then the chlorination is continued at that temperature for approximately 8 hours.

After cooling, an aqueous solution of potassium hydroxide is added with stirring and this is followed by an addition of a solution of potassium permanganate. The addition of potassium hydroxide is continued to keep the reaction mixture strongly alkaline, and the addition of permanganate is continued until an excess remains. The small excess is destroyed by the aid of hydrogen peroxide. The manganese dioxide formed is filtered off. The clear yellow filtrate gives on acidification a precipitate of the potassium salt (III) in very good yield.

Instead of potassium permanganate there may be used also other soluble permanganates such as, for example, sodium or calcium permanganate, and instead of potassium hydroxide sodium hydroxide or other strong bases may be used. However, the use of the potassium salts has the advantage that the sparingly soluble potassium salt of the desired acid can be easily isolated.

The mono-potassium salt may be converted into the free acid or into other salts by customary metathetic reactions. The acid behaves as a normal tetrabasic acid.

*Example 2*

A mixture of 21 parts of the monopotassium salt of o-dicarboxy-phenylphosphoric acid, 3 parts of cupric chloride, 1 part of zirconium chloride, 0.25 part of ammonium molybdate, and 15 parts of urea is heated gradually and the water which forms is removed. Then an additional 5 parts of urea is added and the whole mixture is heated to the fusion temperature. A blue color forms. After cooling, concentrated sulfuric acid is added to the fusion mixture and warmed to 50–55° C., whereupon a dark green solution forms. This is poured into water, causing precipitation of a greenish-blue solid which is removed by filtration and washed. The greenish-blue solid product is soluble in dilute sodium hydroxide solution.

The dyestuff produced dyes cotton a bluish-green color from an acid dye bath and a light bluish-green from an alkaline bath.

This is in part a continuation of our copending application Serial No. 357,356 filed May 25, 1953, now abandoned.

We claim:
1. As new products, compounds of the formula

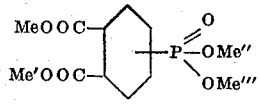

in which Me, Me′, Me″, and Me‴ are the same or different cations.

2. As a new product a mono-potassium salt of the formula

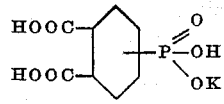

3. A process for the preparation of the phosphonic acid derivative of phthalic acid which comprises chlorinating with elemental chlorine a phosphonic dichloride derivative of o-xylene at a temperature between 100° and 200° C. until at least 2 chlorine atoms have been introduced into the methyl groups, hydrolyzing and oxidizing the resulting product with an alkaline solution of a water soluble metal permanganate.

4. A process according to claim 3 in which the chlorination is catalyzed by irradiation with ultraviolet light.

5. A process according to claim 4 in which the chlorination is continued until 4 to 5 atoms of chlorine have been taken up by the molecule.

6. A process according to claim 5 in which the oxidation is effected with an aqueous solution of potassium hydroxide and potassium permanganate, the manganese dioxide formed is removed by filtration and the reaction mixture is acidified with a mineral acid until the mono-potassium salt precipitates out.

7. A process according to claim 3 in which the oxidation is effected with an aqueous solution of potassium hydroxide and potassium permanganate, the manganese dioxide formed is removed by filtration and the reaction mixture is acidified with a mineral acid until the mono-potassium salt precipitates out.

8. As a new product polychloro derivatives of the compound having the following formula

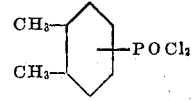

the derivatives having at least 2 and not more than 4 to 5 chlorine atoms in the methyl groups.

9. A process of preparing a compound according to claim 8 which comprises chlorinating with elemental chlorine a phosphonic dichloride derivative of o-xylene at a temperature between 100° and 200° C. until at least one atom of chlorine is introduced into each methyl group.

10. A process according to claim 9 in which the chlorination is continued until approximately 4 to 5 atoms of chlorine have been introduced into each molecule.

11. A process according to claim 10 in which the chlorination is catalyzed by irradiation with ultraviolet light.

12. A process according to claim 9 in which the chlorination is catalyzed by irradiation with ultraviolet light.

References Cited in the file of this patent

UNITED STATES PATENTS

| | | |
|---|---|---|
| 2,610,211 | Darragh et al. | Sept. 9, 1952 |
| 2,666,786 | Kulka et al. | Jan. 19, 1954 |
| 2,683,168 | Jensen et al. | July 6, 1954 |

OTHER REFERENCES

Goddard: A Text-book of Inorganic Chemistry, vol. XI part III, page 102, Griffin and Co., London, 1936.